US011586822B2

(12) United States Patent
Liu et al.

(10) Patent No.: US 11,586,822 B2
(45) Date of Patent: Feb. 21, 2023

(54) ADAPTATION OF REGULAR EXPRESSIONS UNDER HETEROGENEOUS COLLATION RULES

(71) Applicant: International Business Machines Corporation, Armonk, NY (US)

(72) Inventors: Su Liu, Austin, TX (US); Fan Yang, Beijing (CN); Boyi Tzen, Taipei (TW); Debbie A. Anglin, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 16/289,788

(22) Filed: Mar. 1, 2019

(65) Prior Publication Data
US 2020/0279016 A1    Sep. 3, 2020

(51) Int. Cl.
*G06F 40/289*    (2020.01)
*G06F 17/18*    (2006.01)
*G06F 40/166*    (2020.01)
*G06F 40/211*    (2020.01)
*G06N 20/00*    (2019.01)

(52) U.S. Cl.
CPC .......... *G06F 40/289* (2020.01); *G06F 17/18* (2013.01); *G06F 40/166* (2020.01); *G06F 40/211* (2020.01); *G06N 20/00* (2019.01)

(58) Field of Classification Search
CPC ......... G06F 16/24578; G06F 16/24575; G06F 16/9535; G06F 16/367; G06F 40/30; G06F 40/211; G06F 40/284; G06F 40/289; G06F 16/2453; G06F 16/3331; G06F 40/247; G06F 16/243; G06F 16/90332; G06F 40/40; G06F 40/56; G06F 16/00; G06F 16/36; G06F 40/205; G06F 16/3329; G06F 16/3344; G06F 16/84; G06F 3/04883; G06F 40/242; G06F 40/253
USPC .............................................. 704/1, 2, 9, 10
See application file for complete search history.

(56) References Cited

U.S. PATENT DOCUMENTS 5,678,039 A  * 10/1997 Hinks ..................... G06F 9/454
6,618,697 B1 *  9/2003 Kantrowitz ........... G06F 40/232
                                                                    703/2

(Continued)

FOREIGN PATENT DOCUMENTS

KR       20160084670 A   *   7/2016

OTHER PUBLICATIONS

Li et al., "Regular Expression Learning for information Extraction," Proceedings of the 2008 Conference on Empirical Methods in Natural Language Processing, Year: 2008, pp. 21-30.

(Continued)

*Primary Examiner* — Richemond Dorvil
*Assistant Examiner* — Rodrigo A Chavez
(74) *Attorney, Agent, or Firm* — Patterson + Sheridan, LLP (57) ABSTRACT

Method and apparatus for adapting regular expressions for different contexts. Embodiments include identifying a regular expression in an initial form provided by a user. Embodiments include retrieving, from a repository, an adapted form of the regular expression based on the initial form. Embodiments include transforming the regular expression based on the adapted form to generate an adapted regular expression. Embodiments include evaluating the adapted regular expression to produce an output.

12 Claims, 5 Drawing Sheets

(56) References Cited

U.S. PATENT DOCUMENTS

| | | | |
|---|---|---|---|
| 8,805,877 B2* | 8/2014 | Krishmamurthy | ............................ G06F 16/3326 707/766 |
| 2004/0030540 A1* | 2/2004 | Ovil | ...................... G06F 40/253 704/1 |
| 2008/0222149 A1* | 9/2008 | Li | .......................... G06F 40/126 |
| 2009/0030904 A1* | 1/2009 | Gotta | ................. G06F 16/90344 |
| 2009/0083028 A1* | 3/2009 | Davtchev | ................ G06F 40/53 704/9 |
| 2013/0325442 A1* | 12/2013 | Dahlmeier | ............. G06F 40/274 704/9 |
| 2018/0349447 A1* | 12/2018 | MacCartney | ...... G06F 16/24578 |
| 2019/0042556 A1* | 2/2019 | Anders | ................... G06F 40/56 |

OTHER PUBLICATIONS

Mark Davis, "Unicode Regular Expressions," Unicode® Technical Standard #18, dated Feb. 8, 2022, pp. 1-38
"Quick-Start: Regex Cheat Sheet," REXEGG, Date Accessed: Nov. 3, 2022, pp. 1-7 http://www.rexegg.com/regex-quickstart.html#classes.
Phineas Jensen, "Regular Expression Inconsistencies with Unicode," Our Blog, dated Jan. 23, 2018, pp. 1-11.
Babbar et al., "Clustering Based Approach to Learning Regular Expressions over Large Alphabet for Noisy Unstructured Text" Research Gate, Conference Paper Year: 2010, pp. 1-9.

* cited by examiner

```
# echo 1234 | tr [0-9] [〇-九]
```

```
Syntax unknown, please use -ml to launch machine learning
Usage:
    tr [param1] [param2] -ml [specific param1] [specific param2]
```

```
# tr [0-9] [〇-九] -ml [0123456789] [〇一二三四五六七八九]
```

```
Machine Learning complete, please re-run the command
```

```
# echo 1234 | tr [0-9] [〇-九]
```

```
一二三四
```

```
# echo 545467 | tr [0-9] [〇-九]
```

ADAPTATION OF REGULAR EXPRESSIONS UNDER HETEROGENEOUS COLLATION RULES

BACKGROUND

The present disclosure relates to regular expressions, and more specifically, to adaptation of regular expressions for different contexts with varying collation rules.

A regular expression (regex) generally refers to a sequence of characters that define a search pattern. This pattern may be used for a variety of purposes, such as by string searching algorithms for "find" or "find and replace" operations on strings, or for input validation. Regular expression set matching may be used to locate all occurrences of substrings of a given input string matching a regular expression. The regular expression may be a string of symbols (for example, characters, letters, and digits) that defines a pattern used in a search for a matching input string. The symbols used by the regular expression and by the input string are drawn from a set of the symbols, known as an alphabet of the regex. A pattern may consist of one or more character literals, operators, or constructs.

Regular expression applicability is very broad. Several programming languages directly provide regular expression support to ease programmer tasks when dealing with text analysis. Regular expressions are also used in search engines, search and replace dialogs of word processors and text editors, in text processing utilities such as a stream editor (sed), and in lexical analysis.

Evaluation of regular expressions often involves the use of collation rules. Collation generally involves a set of rules for comparing characters in a locale. The unit of comparison is called a collation element or collation unit. By definition, a locale is a subset of a user's environment that defines conventions for a specified culture or group. A collation rule is normally governed by a locale-based specification or standard; for instance, Unicode collation algorithm provides a specification for how to compare Unicode elements. A collation algorithm usually consists of at least three-levels: alphabetic, diacritic, and case comparisons to ensure a consistent result. A collation element may be one character, such as a, A, and 2 in English and a, "a" with accent, in French, or a sequence of characters, such as ch in French and OE in German. Collation rules determine the sorting order of collation elements of a locale. Collation rules are locale-specific, and hence the same set of collation elements may be sorted differently in different locales. For example, letters A, B, D, and c may be sorted as "A B D c" in English and "A B c D" in French.

Due to variations in collation rules, regular expressions may be evaluated differently in different contexts, such as different locales, or may not work properly in certain contexts. For example, if the letters A, B, D, and c are sorted as "A B D c" in English and "A B c D" in French, then the regular expression [A-D] may be evaluated as [ABD] in English and as [ABcD] in French. These inconsistent evaluations may cause unintended and unpredictable results when regular expressions are used in applications throughout various contexts.

As such, there is a need in the art for techniques for adapting regular expressions for use in different contexts that may have different collation rules.

SUMMARY

According to one embodiment of the present invention, a method includes: identifying a regular expression in an initial form provided by a user; retrieving, from a repository, an adapted form of the regular expression based on the initial form; transforming the regular expression based on the adapted form to generate an adapted regular expression; and evaluating the adapted regular expression to produce an output.

In certain embodiments, a computing system may be configured to perform methods described herein. In some embodiments, a computer-readable storage medium may store instructions that, when executed by one or more processors, cause the one or more processors to perform methods described herein.

DETAILED DESCRIPTION

Embodiments presented herein involve adapting regular expressions for different contexts. A regular expression (regex) generally refers to a sequence of characters that define a search pattern. The search pattern may be used for a variety of purposes, such as by string searching algorithms for "find" or "find and replace" operations on strings, or for input validation. Evaluation of regular expressions often involves the use of collation rules. Collation rules may vary across different contexts, such as for different locales. For example, collation rules for different locales may specify different orders for sorting certain characters. As such, certain regular expressions may be evaluated differently in different contexts, such as in different locales with varying collation rules.

It may be difficult and time-consuming to modify and debug regular expression patterns for different locales. Furthermore, many automated test tools are not designed to test the same regular expressions in different locales. Therefore, in order to overcome these obstacles, techniques described herein involve dynamically adapting regular expressions for different contexts based on learned adaptations.

In one example, a user of an application in a given context, such as a given locale, defines adapted forms of regular expressions for the given context. For instance, a user of a software development application may provide an application command that includes a regular expression and then may determine that the regular expression does not work properly in the given locale. The application may, for example, notify the user that syntax of the regular expression is not recognized. Alternatively, the application may provide the user with an output that is different than what the user expected based on the regular expression. For example, the given locale may have collation rules that are different from what the user expected, and so the results of evaluating the regular expression may be inaccurate. As such, the user may initiate a process to define an adapted form of the regular expression. In some embodiments, the user is prompted to define the adapted form of the regular expression.

The user may, for instance, specify a more explicit form of the regular expression for the given context. For example, if the regular expression provided by the user is [A-E] (e.g., a regular expression specifying a range indicated by a "-" or dash character) and the collation rules of the given context result in the regular expression being incorrectly evaluated as [AaBbCcDdE], the user may specify that the adapted form of the regular expression [A-E] is [ABCDE]. In some embodiments, the user specifies the adapted form by providing input to a user interface associated with the application. The adapted form of the regular expression may then be stored in a local repository for the user, and may be used to transform the regular expression whenever it used again by the user in the given context. For instance, the next time the user provides an application command including the regular expression [A-E], the adapted form may be retrieved from the local repository and used to automatically transform the regular expression into [ABCDE].

As users in various contexts define adapted forms of regular expressions according to techniques described herein, a centralized system may monitor these adapted forms that are stored in local repositories in order to learn global adaptations that can be shared with other users. For example, statistical analysis may be performed in order to identify trends in adapted forms of regular expressions in various contexts in order to identify adapted forms that can be stored in a global repository and/or provided for use in association with different users. In one example, if it is determined that a threshold percentage or number of users in a given context (e.g., locale) have locally defined a particular adapted form of a given regular expression, then the particular adapted form may be stored in a global repository for use by other users in the given context and/or transmitted to client devices associated with other users in the given context for storage in local repositories. The global repository may store adapted forms of regular expressions in association with initial forms of the regular expressions (e.g., the forms in which the regular expressions were initially provided by users) and also in association with context information (e.g., identifiers of the locales in which the initial forms and/or adapted forms were defined, application attributes, user attributes, and the like). In some embodiments, certain adapted forms of regular expressions stored in the global repository may be provided to users automatically, such as to users in contexts matching those associated with the adapted forms in the global repository.

Accordingly, techniques described herein allow for both user-guided and automated learning techniques for adapting regular expressions for different contexts. User-guided learning at a local level may be automatically analyzed and used to guide automated learning processes at a global level so that users may be automatically provided with adapted forms of regular expressions based on context. It is noted that, as used herein, "local" generally refers to something that takes place or is stored on the level of an individual user or client device, while "global" generally refers to something that takes place or is stored at a centralized level that is common to a plurality of users and/or client devices.

Figure 1:
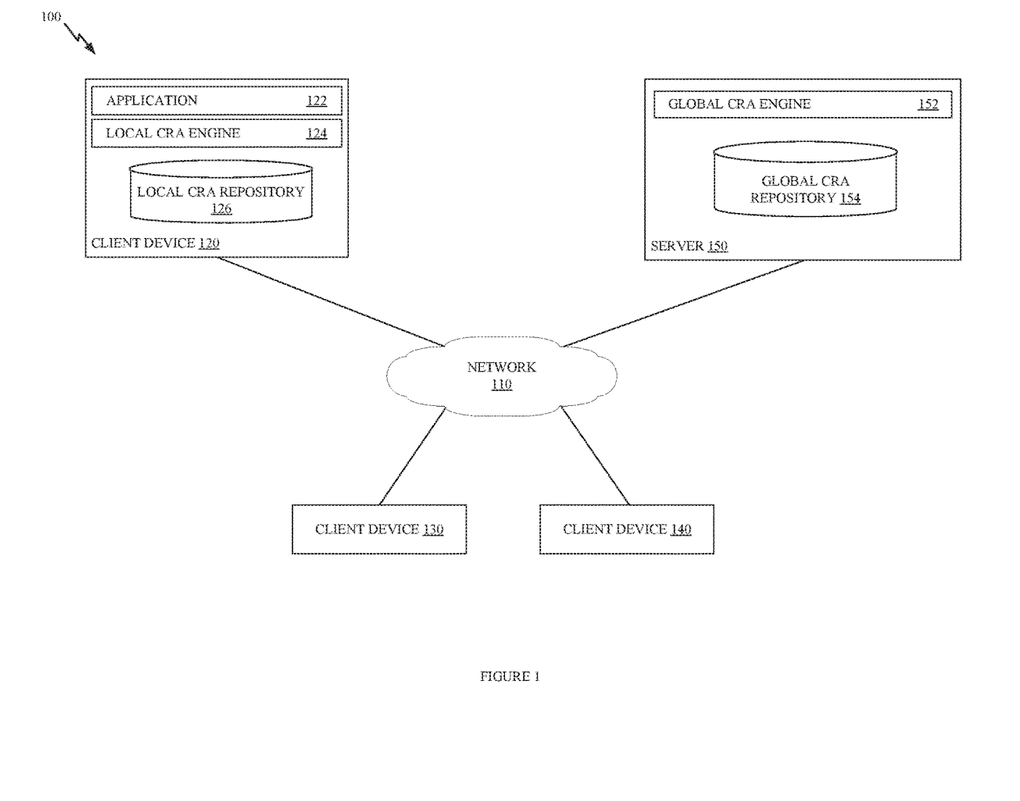
FIG. 1 illustrates an example networked environment in which regular expressions may be adapted for different contexts, according to embodiments of the present disclosure.

FIG. 1 illustrates an example networked computing environment in which regular expressions may be adapted for different contexts, according to embodiments of the present disclosure. As illustrated, computing environment 100 includes client devices 120, 130, and 140 and server 150, connected via network 110. Network 110 may generally represent a connection over which data may be transmitted. For example, network 110 may be a local area network, wide area network, cellular network, ad-hoc network, near-field communication network, the Internet, or any other known or later developed network.

Client devices 120, 130, and 140 are generally representative of computing devices through which a user can interact with applications, such as application 122, provide application commands including regular expressions, define adapted forms of regular expressions as described herein, and the like. Client devices 120, 130, and 140 may each be, for example, a laptop computer, a desktop computer, a thin client, a tablet computer, a mobile computing device, or the like. Client device 120 is included to be representative of each of client devices 120, 130, and 140, and components depicted and described with respect to client device 120 may also be included in client devices 130 and 140. Furthermore, client devices 120, 130, and 140 may generally be representative of a plurality of client devices, and a larger or smaller number of client devices may be present in computing environment 100.

Client device 120 includes an application 122, which may be representative of an application to which a user provides application commands including regular expressions. For example, application 122 may comprise a software development application, a command line interface, a web browser, a search engine or information retrieval application, a word processor, a text editor, and/or another type of application in which regular expressions may be used. In some embodiments, application 122 comprises a user interface through which the user provides input to and receive output from application 122.

Client device 120 further includes a local cognitive regular expression (regex) adaptation (CRA) engine 124, which generally performs operations related to adapting regular expressions for different contexts at a local or user level. It is noted that operations described as being performed by local CRA engine 124 may alternatively be performed using different combinations of local and/or remote components.

Local CRA engine 124 may receive application commands provided by a user, such as from application 122, and identify regular expressions present in the application commands. In some embodiments, local CRA engine 124 attempts to evaluate regular expressions and, if successful, outputs results of evaluating the regular expressions, such as to application 122. If unable to successfully evaluate a given regular expression, local CRA engine 124 may output an indication that the given regular expression could not be evaluated, such as including a description of why the given regular expression could not be evaluated (e.g., "syntax unknown").

Local CRA engine 124 may access local CRA repository 126 in order to determine whether an adapted form of a given regular expression is stored. For example, local CRA repository 126 may generally represent a data storage entity or file that stores mappings between initial forms of regular expressions and adapted forms of regular expressions for a given user in a given context. An initial form of a regular expression may, for instance, be a form in which a given user initially provided the regular expression, while an adapted form of the regular expression may be a more precise or explicit form that the user specifies for the regular expression through a learning process.

In one embodiment, local CRA engine 124 receives a regular expression in an initial form that was provided by a user of application 122 and determines whether the initial form is mapped to an adapted form for the regular expression in local CRA repository 126, such as for a particular locale in which the user provided the regular expression. If an adapted form for the regular expression is found in local CRA repository 126 for the particular locale, then local CRA engine 124 may transform the regular expression from the initial form into the adapted form. Local CRA engine 124 may then evaluate the regular expression in the adapted form and provide the result of evaluating the regular expression to the user, such as through application 122. In one example, the regular expression is provided by the user in the context of an application command, such as a search command or a translate command to application 122, and the regular expression is evaluated as part of evaluating the application command. Furthermore, while local CRA engine 124 may evaluate regular expressions and/or application commands in some cases, there may be other embodiments where local CRA engine 124 adapts regular expressions and then passes the adapted regular expressions to one or more different components for evaluation.

Local CRA engine 124 may allow users to define adapted forms of regular expressions. For example, a user may provide input, such as via application 122, defining an adapted form for a given regular expression. In one example, the user specifies that an adapted form for the regular expression "tr [1-7] [ 月-日 ]" (e.g., which is a regular expression for translating the numbers 1-7 into the Japanese symbols for each day of the week) is "tr [1234567] [ 月火水木金土日 ]". The user may provide the adapted form through input comprising a particular command, such as a "machine learning" (ml) command supported by local CRA engine 124. For example, the user may define the adapted form by providing the command "tr [1-7] [ 月-日 ]-ml [1234567] [ 月火水木金土日 ]" to application 122. As such, local CRA engine 124 may store a mapping between the initial form "tr [1-7] [ 月-日 ]" and the adapted form "tr [1234567] [ 月火水木金土日 ]" in local CRA repository 126. In some embodiments, local CRA engine 124 also stores context information along with the mapping, such as an identifier of a locale for which the user defined the adapted form. For example, context information may include the locale identifier "JA_JP.UTF-8", which signifies that the language is Japanese, the country is Japan, and that UTF-8 or Unicode (Universal Coded Character Set) Transformation Format 8-bit encoding is used. The context information may be determined based on attributes of the user, the application, and/or the application command.

Subsequently, if the user provides the regular expression "tr [1-7] [ 月-日 ]" in the given context, then local CRA engine 124 will locate the adapted form "tr [1234567] [ 月火水 木金土日 ]" based on the mapping stored in local CRA repository 126 and use the adapted form to transform the regular expression. Thus, regardless of collation rules for the given context, the regular expression will be evaluated in the way in which it is expected by the user to be evaluated.

Server 150 is generally representative of a computing device, such as a server computer or desktop computer, that performs operations related to adapting regular expressions for different contexts for a plurality of users. Server 150 includes global CRA engine 152, which generally performs operations related to tracking and analyzing local adaptations of regular expressions in order to determine globally applicable adaptations. For example, global CRA engine 152 may track operation of regular expressions at client devices 120, 130, and 140, such as by receiving information related to regular expressions from local CRA engine 124 and/or local CRA repository 126 (and corresponding local components of client devices 130 and 140).

In some embodiments, global CRA engine 152 regularly receives adapted forms of regular expressions and associated information (e.g., initial forms of the regular expressions and context information) from client devices 120, 130, and 140 and identifies trends. In one embodiment, global CRA engine 152 performs statistical analysis to identify adapted forms of regular expressions that have been frequently defined by users in certain contexts. For example, global CRA engine 152 may determine whether a threshold percentage or number of users in a given context have defined a given adapted form of a regular expression and, if so, may store the given adapted form and associated information in global CRA repository 154.

Global CRA repository 154 generally represents a data storage entity or file that, like local CRA repository 126, stores mappings between initial forms of regular expressions and adapted forms of the regular expressions. In some embodiments, the mappings also include context information. Adapted forms of regular expressions stored in global CRA repository 154 may be provided to various users, such as users of client devices 120, 130, and 140, based on context information. For example, if a user of client device 140 is associated with a given locale, then global CRA engine 152 may provide one or more adapted forms of regular expressions that are mapped to the given locale in global CRA repository 154 to client device 140. Client device 140 may store the adapted form along with its corresponding initial form and, in some embodiments, context information, in a local CRA repository for use in adapting regular expressions. It is noted that in some embodiments, rather than storing "global" adapted forms of regular expressions in global CRA repository 154, global CRA engine 152 may alternatively distribute a given adapted form to applicable client devices upon determining that it is relevant, such as based on statistical analysis or another technique. As such, global CRA engine 152 is able to learn adapted forms of regular expressions that are defined by individual users locally on client devices but that are also more broadly applicable to other users.

While client devices 120, 130, and 140 and server 150 are illustrated as separate components in FIG. 1, it should be recognized that functionality described with respect to client devices 120, 130, and 140 and server 150 may be implemented on any number of computing systems, either as one or more standalone systems or in a distributed environment.

Figure 2:
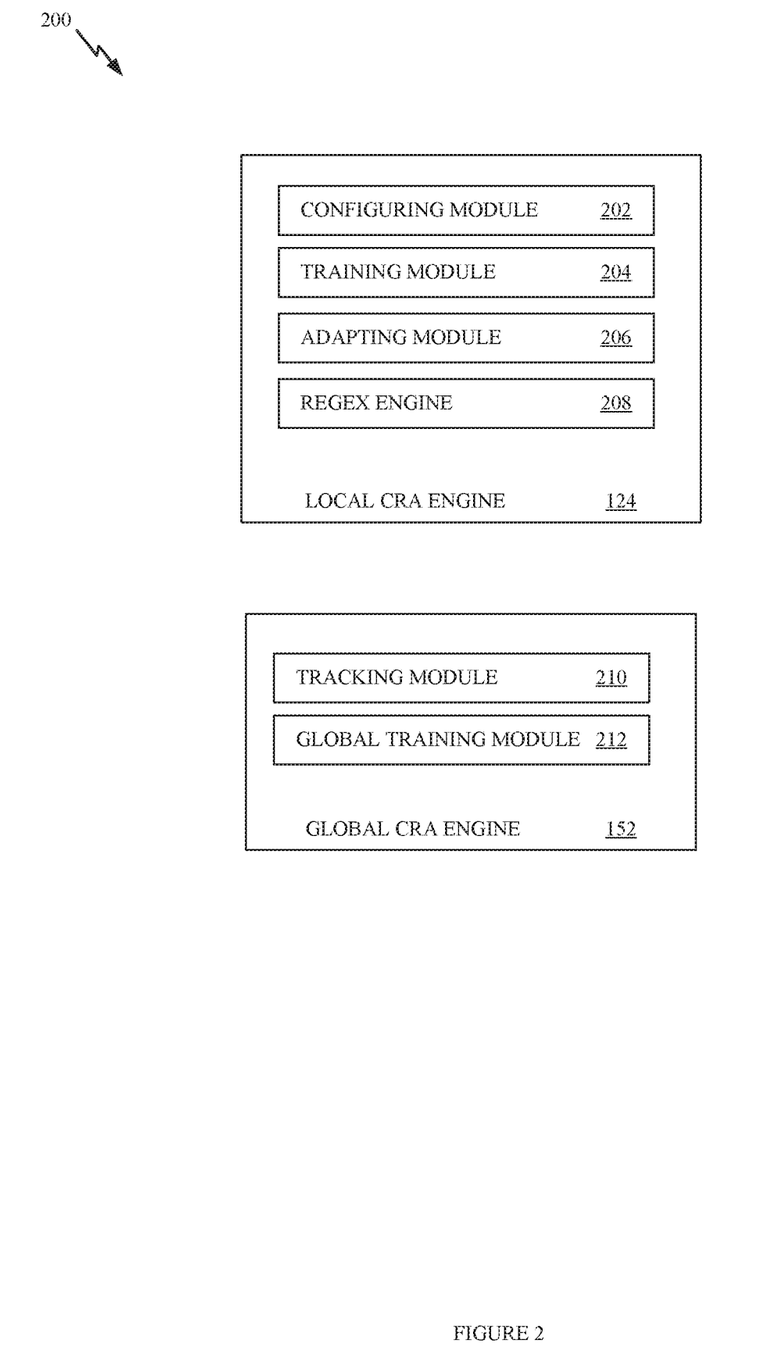
FIG. 2 illustrates example components related to adapting regular expressions for different contexts, according to embodiments of the present disclosure.

FIG. 2 illustrates an example 200 of components related to adapting regular expressions for different contexts, according to embodiments of the present disclosure. Example 200 includes local CRA engine 124 and global CRA engine 152 of FIG. 1.

Local CRA engine 124 includes configuring module 202, which generally performs operations related to configuration of local CRA engine 124. For example, configuring module 202 may allow a user to specify one or more configuration parameters related to operation of local CRA engine 124, and the configuration parameters may be stored in a configuration file. Configuration parameters may include, for example, attributes of local CRA repository 126 of FIG. 1, such as a file name and storage location, user preferences (e.g., locales and applications relevant to the user), synchronization preferences (e.g., whether and how often the user wishes to receive adapted forms of regular expressions from and/or share locally adapted forms of regular expressions with global CRA engine 152), and the like.

Local CRA engine 124 further includes training module 204, which generally performs operations related to learning adapted forms of regular expressions. For example, training module 204 may prompt the user of client device 120 of FIG. 1, such as via application 122 of FIG. 1, to define an adapted form of a regular expression, such as after detecting an error when evaluating an initial form of the regular expression. In other embodiments, the user may initiate the process without being prompted. Training module 204 may receive definitions of adapted forms of regular expressions from the user, and may store the adapted forms along with initial forms and context information (e.g., locale identifiers of adapted forms and/or initial forms, an application identifier of application 122 of FIG. 1, a user identifier of the user, and/or the like) as mapping information in local CRA repository 126 of FIG. 1. Training module 204 may further perform operations related to synchronizing local CRA repository 126 of FIG. 1 with other repositories, such as global CRA repository 154 and/or other local CRA repositories. For example, training module 204 may transmit all mapping information stored in local CRA repository 126 of FIG. 1 to global CRA engine 152 of FIG. 1 for analysis. Global CRA engine 152 of FIG. 1 may then determine, based on an analysis of the mapping information in conjunction with mapping information received from a plurality of users, whether to store the mapping information in global CRA repository 154 of FIG. 1 and/or to distribute the mapping information to given client devices associated with given users. For example, global CRA engine 152 may perform statistical analysis on mapping information received from a plurality of users by determining how many times a given adapted form of a regular expression appears in the mapping information in association with a given context (e.g., locale identifier) and a given initial form of the regular expression. As such, global CRA engine 152 may determine whether the given adapted form is used commonly enough in the context to consider the given adapted form for global use, such as for other users associated with the context. If, for example, a threshold number or percentage of users have defined the given adapted form in the context, then global CRA engine 152 may store the given adapted form (along with the information it is mapped to) in global CRA repository 154 of FIG. 1 and/or send the given adapted form (along with the information it is mapped to) as mapping information to client devices associated with the context. Training module 204 may, for example, receive the mapping information from global CRA engine 152 of FIG. 1 and store the mapping information in local CRA repository 126 of FIG. 1.

Local CRA engine 124 further includes adapting module 206, which generally performs operations related to adapting regular expressions for different contexts, such as by determining whether an adapted form of a given regular expression is mapped in a repository to a received initial form of the given regular expression and/or information related to a given context in which the given regular expression is received. For example, adapting module 206 may identify a given regular expression in an initial form, such as in a user-provided application command received from application 122 of FIG. 1, and determine (e.g., based on mapping information stored in a repository as described herein) whether an adapted form of the regular expression is applicable. For example, adapting module 206 may determine context information related to the regular expression, such as a locale, an identifier of application 122 of FIG. 1 to which the user provided the application command, an identifier of the user, and/or the like. Adapting module 206 may then determine whether there is an adapted form of the regular expression mapped to the initial form and/or the context information in local CRA repository 126 of FIG. 1. In certain embodiments, adapting module 206 may also access global CRA repository 154 of FIG. 1 in order to determine whether there is an adapted form of the regular expression mapped to the initial form and/or the context information in global CRA repository 154 of FIG. 1. In other embodiments, any "global" adapted forms applicable to local CRA engine 124 have already been provided by global CRA engine 152 of FIG. 1 to local CRA engine 124 and stored in local CRA data store 126. Upon determining that an adapted form of the regular expression is applicable for the context, adapting module 206 may transform the regular expression based on the adapted form. For example, the initial form may be replaced with the adapted form of the regular expression.

Local CRA engine 124 further includes regex engine 208, which generally performs operations related to evaluating regular expressions. For example, regex engine 208 may receive a regular expression, which may have been transformed by adapting module 206 based on an adapted form, and evaluate the regular expression to determine a result. For example, regex engine 208 may apply any collation rules applicable under the context and/or apply an adapted form in order to determine an output, such as a sequence of characters identified by the regular expression. In certain embodiments, regex engine 208 may evaluate a regular expression as part of evaluating a larger application command, such as a search command, and then may return a result of evaluating the regular expression and/or the application command to application 122 of FIG. 1. In some embodiments, regular expressions and/or application commands are evaluated separately from local CRA engine 124, such as by a different component of client device 120 of FIG. 1.

Global CRA engine 152 includes a tracking module 210, which generally performs operations related to tracking locally defined adapted forms of regular expressions and identifying adapted forms that may have broader applicability. Tracking module 210 may receive mapping information (e.g., including initial forms and adapted forms of regular expressions along with context information) from client devices, such as from local CRA engine 124 of client device 120 of FIG. 1 and from corresponding local CRA engines of other client devices, such as at regular intervals or whenever new adapted forms of regular expressions are locally defined and stored in local CRA repositories. Tracking module 210 may also track other information related to regular expressions on various client devices, such as returned mismatch errors. For example, tracking module 210 may receive logs of operations related to regular expression from client devices.

Global CRA engine 152 further includes a global training module 212, which generally performs operations related to learning adapted forms of regular expressions with broader applicability based on locally defined adapted forms. For example, global training module 212 may analyze the mapping information and/or other information (e.g., logs) received by tracking module 210 to identify trends. A trend may be identified, for instance, when a given adapted form appears a certain number of times in association with a given context in the mapping information. For example, if a certain number of users in a particular locale have locally defined the same adapted form of a given regular expression, global training module 212 may identify the adapted form as a globally applicable adapted form of the regular expression for the particular locale and/or for other similar locales (e.g., locales with a common country, language, encoding scheme, and/or the like). Global training module 212 may store mapping information that maps the adapted form to an initial form and context information in global CRA repository 154 of FIG. 1 and/or may transmit the mapping information to one or more other client devices to which the mapping information is considered applicable (e.g., based on context information associated with the client devices).

Figure 3:
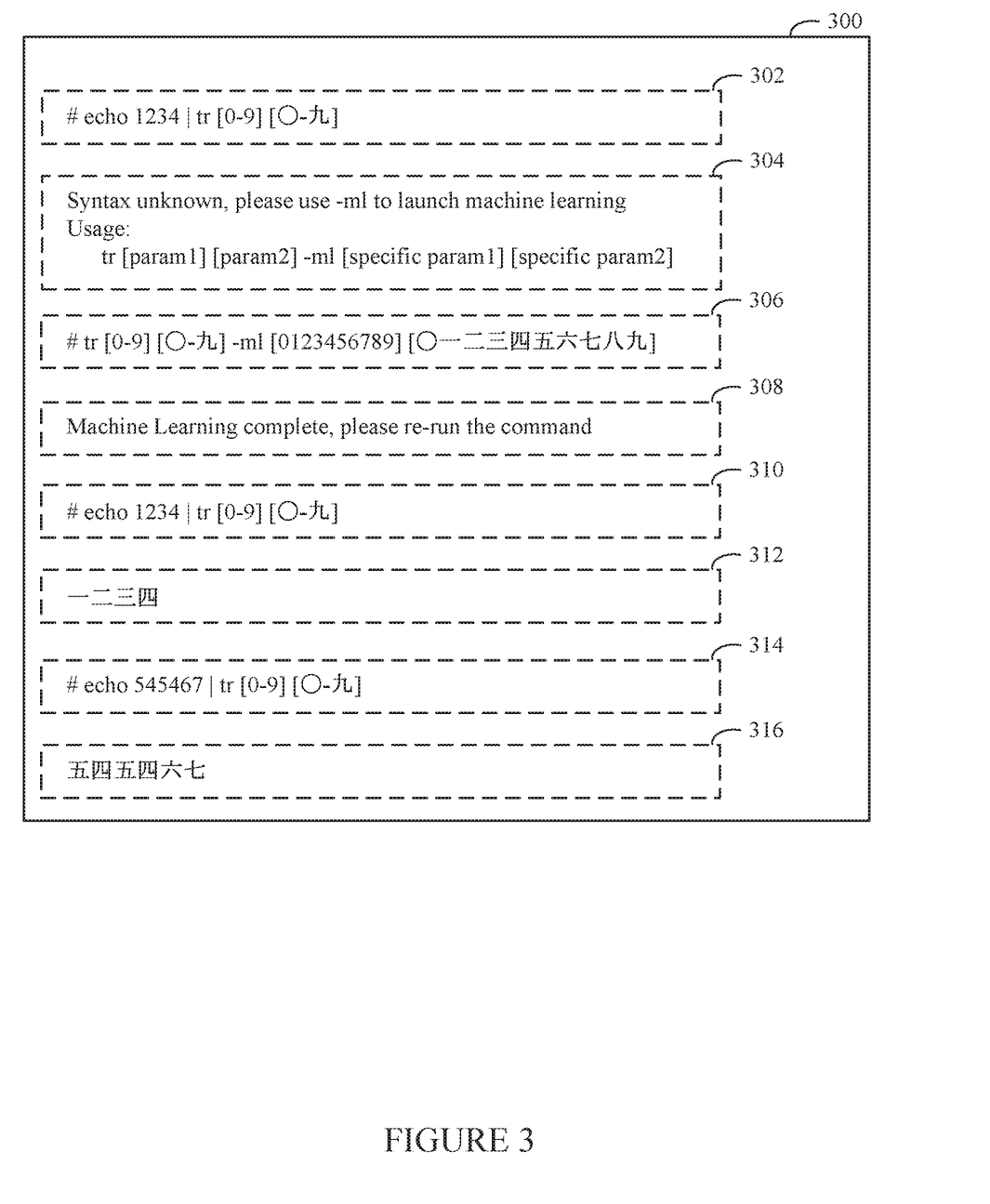
FIG. 3 illustrates an example of adapting regular expressions for different contexts, according to embodiments of the present disclosure.

FIG. 3 illustrates an example of adapting regular expressions for different contexts, according to embodiments of the present disclosure. FIG. 3 includes a user interface 300, which may be associated with application 122 of FIG. 1, and which may allow a user to provide input and receive output related to application 122 and/or local CRA engine 124 of FIG. 1. For example, user interface 300 may provide a command line interface through the user provides application commands (e.g., in an interpreted programming language) and through which the user is provided with output based on the application commands.

First, the user provides application command 302, "echo 1234 tr [0-9] [ 〇-九 ]". Application command 302 is an echo command (e.g., a command to display a standard output of an input string) in which the output string is to be translated based on a translate command (e.g., a tr command) wherein the numbers 0-9 are to be translated to the Chinese numbers 〇-.九.

Output 304 is provided to the user in response to application command 302, reading "Syntax unknown, please use -ml to launch machine learning" and providing an example usage of the -ml command, "Usage: tr [param1] [param2]-ml [specific param1] [specific param2]". Output 304 generally indicates that there was unknown syntax used in application command 302, such as because the syntax of "[0-9] [ 〇-九 ]" does not work properly or is not known in the locale in which the regular expression was provided.

In response to output 304, the user provides application command 306, "tr [0-9] [ 〇-九 ]-ml [0123456789] [ 〇一二三四五六七八九 ]". Application command 306 is a -ml command, as suggested in output 304, and defines an adapted form ([0123456789] [ 〇一二三 四五六七八九 ]) of the initial form ([0-9] [ 〇-九 ]) of the regular expression for the context. In other words, [0-9] should be adapted to [0123456789] and [ 〇-九 ] should be adapted to [ 〇一 二三四五六七八九 ] in the context. For example, local CRA engine 124 of FIG. 1 may determine a context in which application command 306 was received and store a mapping between the context information (e.g., locale identifier, application parameters, user identifier, and/or the like), the initial form ([0-9] [ 〇-九 ]), and the adapted form ([0123456789] [ 〇一二 三四五六七八九 ]) in local CRA repository 126 of FIG. 1.

In response to application command 306, the user is provided with output 308, "Machine Learning complete, please re-run the command". Output 308 indicates that the -ml command was successful, and that the original application command 302 may now be re-entered by the user.

The user provides application command 310, which is the same as the original application command 302, "echo 1234 tr [0-9] [〇-九 ]". This time, the syntax is recognized, since there is an adapted form of the regular expression available. For example, local CRA engine 124 may determine a context of application command 310 (e.g., the Chinese locale ZH_Conn.UTF-8), and may determine that an adapted form ([0123456789] [ 〇一二三四五六 七八九 ]) is mapped to the initial form ([0-9] [ 〇-九 ]) of the regular expression and to the context in local CRA repository 126 of FIG. 1. As such, local CRA engine 124 may transform the regular expression based on the adapted form and evaluate application command 310 accordingly.

In response to application command 310, the user is provided with output 312, "一 二三四". Application command 310 comprises an echo command to display the string 1234 in which the output string is to be translated based on a translate command wherein the numbers 0-9 are to be translated to the Chinese numbers 〇-九. As such, output 312 includes the numbers 1234 translated into their Chinese counterparts 一二三四 based on the adapted form of the regular expression.

The user then provides application command 314, "echo 545467|tr [0-9] [〇-九 ]". For example, local CRA engine 124 may determine a context of application command 314 (e.g., the Chinese locale ZH_Conn.UTF-8), and may again determine that an adapted form ([0123456789] [ 〇一二三四五六七八九 ]) is mapped to the initial form ([0-9] [ 〇-九 ]) of the regular expression and to the context in local CRA repository 126 of FIG. 1. As such, local CRA engine 124 may transform the regular expression based on the adapted form and evaluate application command 314 accordingly.

In response to application command 314, the user is provided with output 316, "五 四五四六七". Application command 314 comprises an echo command to display the string 545467 in which the output string is to be translated based on a translate command wherein the numbers 0-9 are to be translated to the Chinese numbers 〇-九. As such, output 316 includes the numbers 545467 translated into their Chinese counterparts 五四五四六七 based on the adapted form of the regular expression.

Figure 4:
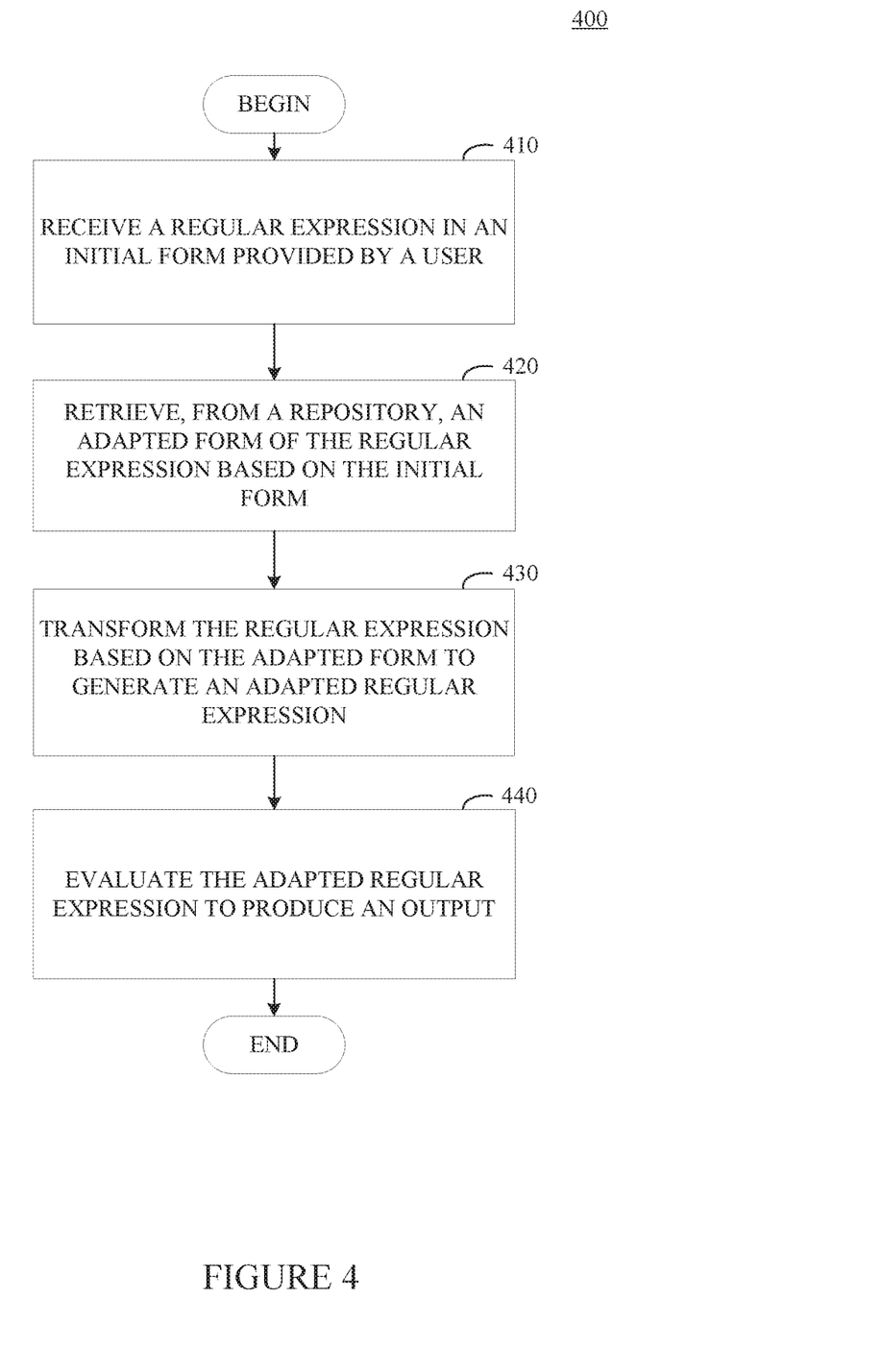
FIG. 4 illustrates example operations for adapting regular expressions for different contexts, according to embodiments of the present disclosure.

FIG. 4 illustrates example operations 400 for adapting regular expressions for different contexts, according to embodiments of the present disclosure. For example, operations 400 may be performed by local CRA engine 124 of FIG. 1.

At step 410, a regular expression is received in an initial form provided by a user. For example, the user may have provided an application command that includes the regular expression to an application, such as application 122 of FIG. 1, and the application may have provided the application command (or the regular expression) to local CRA engine 124 of FIG. 1. In one example, the regular expression is provided in an initial form that indicates a range, such as "[A-E]".

At step 420, an adapted form of the regular expression is retrieved from a repository based on the initial form. For example, local CRA engine 124 of FIG. 1 may access local CRA repository 126 of FIG. 1 to identify that the initial form is mapped to the adapted form of the regular expression in mapping information stored in local CRA repository 126. In some embodiments, local CRA engine 124 of FIG. 1 also determines a context related to the regular expression, such as by determining a locale in which the regular expression and/or application command was received, one or more attributes related to the application, the application command, and/or the user, such as an application identifier and/or a user identifier, and/or the like. In certain embodiments, local CRA engine 124 of FIG. 1 also uses the context in retrieving the adapted form from the repository, such as by determining that the adapted form is mapped to a combination of the initial form and the context in local CRA repository 126 of FIG. 1. In one example, the adapted form is "[ABCDE]" and the initial form is "[A-E]".

It is noted that the repository may include mappings between initial forms of regular expressions (and, in some cases, context information) and adapted forms of the regular expressions. In some embodiments, the repository is a local repository such as local CRA repository 126 of FIG. 1 while in other embodiments the repository is a global repository, such as global CRA repository 154 of FIG. 1. In some embodiments, the mappings in the repository have been learned based on input from the user and/or based on input from a plurality of users. For example, the repository may include adapted forms of regular expressions provided by the user through a user-guided learning process as described herein. In some examples, the repository includes adapted forms of regular expressions defined by other users. For instance, statistical analysis may have been performed to identify trends across different users' defined adapted forms of regular expressions, such as to determine whether a threshold percentage or number of users in a given context have defined a given adapted form of a regular expression. For example, global CRA engine 152 of FIG. 1 may perform this analysis and identify locally defined adapted forms or regular expressions that may be stored in global CRA repository 154 and/or provided to other local CRA repositories, such as local CRA repository 126, such as based on context. In some embodiments, the repository is synchronized with one or more additional repositories, such as global CRA repository 154 of FIG. 1 and/or other local repositories associated with other users and/or client devices.

At step 430, the regular expression is transformed based on the adapted form in order to generate an adapted regular expression. For example, local CRA engine 124 of FIG. 1 may transform the initial form into the adapted form of the regular expression. In one example, "[A-E]" is transformed into "[ABCDE]" based on the adapted form retrieved from the repository.

At step 440, the adapted regular expression is evaluated to produce an output. For example, local CRA engine 124 of FIG. 1 may evaluate the adapted regular expression in order to determine a sequence of character literals, numbers, operators, and/or constructs indicated by the adapted regular expression. In one example, "[ABCDE]" is evaluated to produce the sequence of A, B, C, D, and E. In some embodiments the regular expression is evaluated as part of evaluating a larger application command. For example, an application command may involve displaying a certain subset of characters that have been translated from one set into another set, and the regular expression may be used to define one or more of the sets. In some embodiments, the regular expression and/or the application command are evaluated by a separate component from local CRA engine 124 of FIG. 1. In certain embodiments, the output is provided to the user, such as via a user interface associated with application 122 of FIG. 1. In other embodiments, the output is used to perform further processing, such as if the regular expression was included in source code for a computer program.

Figure 5:
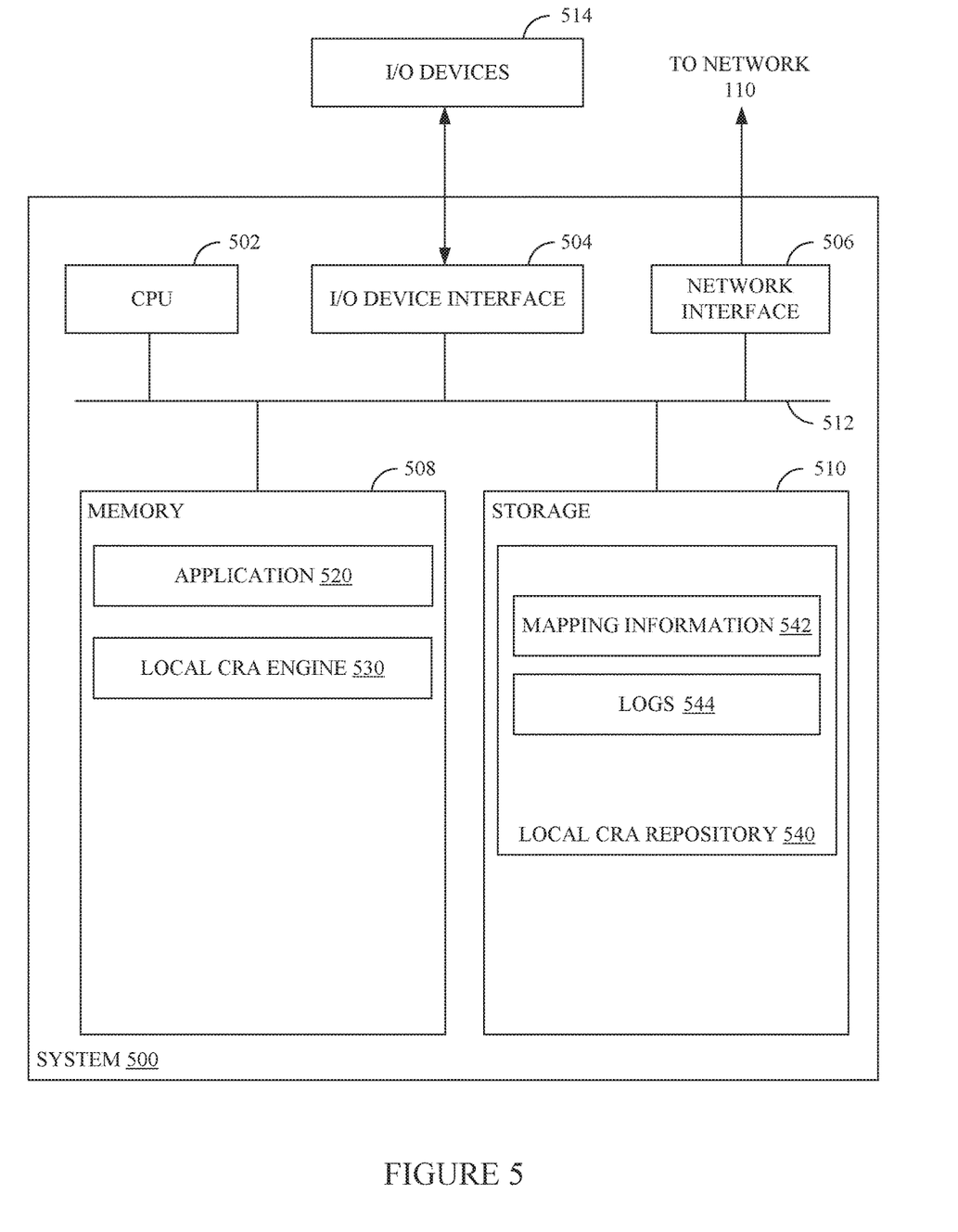
FIG. 5 illustrates an example system in which aspects of the present disclosure may be performed.

FIG. 5 depicts a computing system 500 with which embodiments of the present disclosure may be implemented. For example, computing system 500 may represent client device 120 of FIG. 1.

System 500 includes a central processing unit (CPU) 502, one or more I/O device interfaces 504 (that may provide connections for various I/O devices 514, such as keyboards, displays, mouse devices, and the like) to the system 500, network interface 506 (e.g., a physical network interface card), memory 508, storage 510, and an interconnect 512. It is noted that one or more components of system 500 may alternatively be located remotely and accessed via a network, such as network 110. It is further contemplated that one or more components of system 500 may comprise physical or virtualized components.

CPU 502 may receive and execute instructions stored in memory 508. Similarly, the CPU 502 may receive and store data related to applications in memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and other arrangements.

Additionally, the memory 508 may represent a random access memory. Memory 508 comprises application 520 and local CRA engine 530, which generally represent application 122 and local CRA engine 124 of FIG. 1.

Storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises local CRA repository 540, which is generally representative of local CRA repository 154 of FIG. 1. Local CRA repository 540 includes mapping information 542 and logs 544. For instance, mapping information 542 may include mappings between initial forms of regular expressions (and, in some cases context information) and adapted forms of the regular expressions, which may have been generated by local CRA engine 530 based on input provided by a user of system 500 and/or based on input from additional users as described herein. For example, one or more mappings in mapping information 542 may have been received from a global CRA repository, such as global CRA repository 154 of FIG. 1, such as if the one or more mappings have been defined by a threshold percentage or number of users in a context associated with the user of system 500. Logs 544 may comprise logged operations of local CRA engine 530 and/or application 520, such as related to evaluation and adaptation of regular expressions. In some instances, logs 544 are used to identify mismatch errors related to evaluation of regular expressions so that the user of system 500 can be prompted to initiate a learning command to provide adapted forms of the regular expressions. In some embodiments, logs 544 and/or mapping information 542 are provided, such as by local CRA engine 530, to a centralized location, such as global CRA engine 152 of FIG. 1, for analysis.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Reference is made herein to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., application 122 of FIG. 1) or related data available in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
identifying a regular expression in a command provided by a user, wherein the regular expression comprises a first sequence of characters that define a first search pattern, and wherein the regular expression has a first meaning in relation to a context related to the regular expression;
determining the context related to the regular expression, based on at least one of: (i) one or more attributes related to the command, (ii) one or more attributes related to the user, or (iii) one or more attributes related to an application associated with the command;
determining, based on the command, that the first meaning of the first search pattern defined by the regular expression is inconsistent with the context related to the regular expression;
retrieving, from a data repository, an adapted form of the regular expression based on the determining and the context, comprising:
identifying one or more mappings between (a) adapted forms of regular expressions and (b) combinations of:
(i) contexts of the regular expressions, and
(ii) initial forms of the regular expressions,
wherein the one or more mappings have been learned based on input from a plurality of users,
wherein the learning is based on determining that a threshold value is met for a percentage or number of users defining the adapted forms of regular expressions, and
wherein the threshold value relates to both: (i) the percentage or number of users and (ii) the context, and is selected from among a plurality of different threshold values corresponding to a plurality of different contexts;
transforming the regular expression based on the adapted form to generate an adapted regular expression, wherein the adapted regular expression comprises a second sequence of characters that define a second search pattern, different from the first search pattern, and has a second meaning, different from the first meaning, that is consistent with the context; and
evaluating the adapted regular expression to produce an output.

2. The computer-implemented method of claim 1, wherein the data repository is associated with the user, and wherein a mapping of the one or more mappings is between the adapted form and an initial form of the regular expression associated with the command.

3. The computer-implemented method of claim 2, wherein the one or more mappings have been learned based on input from the user with respect to the regular expressions.

4. The computer-implemented method of claim 2, further comprising synchronizing the data repository with a central repository that is shared by a plurality of users.

5. The computer-implemented method of claim 1, wherein the one or more mappings have been learned based further on mismatch errors returned by evaluation of regular expressions, identified based on tracking evaluation of the regular expressions in the contexts.

6. The computer-implemented method of claim 1, wherein the context comprises one or more of:
a locale;
an attribute related to an application command in which the regular expression is included; or
an attribute of the user.

7. A system, comprising one or more processors and a computer-readable storage medium having computer-readable program code embodied therewith, the computer-readable program code executable by the one or more processors to:
identify a regular expression in command provided by a user, wherein the regular expression comprises a first sequence of characters that define a first search pattern, and wherein the regular expression has a first meaning in relation to a context related to the regular expression;
determine the context related to the regular expression, based on at least one of: (i) one or more attributes related to the command, (ii) one or more attributes related to the user, or (iii) one or more attributes related to an application associated with the command;

determine, based on the command, that the first meaning of the first search pattern defined by the regular expression is inconsistent with the context related to the regular expression;

retrieve, from a data repository, an adapted form of the regular expression based on the context and the first meaning being inconsistent with the context, comprising:

identifying one or more mappings between (a) adapted forms of regular expressions and (b) combinations of:

(i) contexts of the regular expressions, and
(ii) initial forms of the regular expressions, wherein the one or more mappings have been learned based on input from a plurality of users, wherein the learning is based on determining that a threshold value is met for a percentage or number of users defining the adapted forms of regular expressions, and wherein the threshold value relates to both: (i) the percentage or number of users and (ii) the context, and is selected from among a plurality of different threshold values corresponding to a plurality of different contexts;

transform the regular expression based on the adapted form to generate an adapted regular expression, wherein the adapted regular expression comprises a second sequence of characters that define a second search pattern, different from the first search pattern, and has a second meaning, different from the first meaning, that is consistent with the context; and evaluate the adapted regular expression to produce an output.

8. The system of claim 7, wherein the data repository is associated with the user, wherein a mapping of the one or more mappings is between the adapted form and an initial form of the regular expression associated with the command.

9. The system of claim 8, wherein the one or more mappings have been learned based on input from the user with respect to the regular expressions.

10. The system of claim 8, wherein the one or more processors are further configured to synchronize the data repository with a central repository that is shared by a plurality of users.

11. The system of claim 7, wherein the context comprises one or more of:

a locale;
an attribute related to an application command in which the regular expression is included;
or an attribute of the user.

12. A computer-readable storage medium having computer-readable program code embodied therewith, the computer-readable program code executable by one or more computer processors to perform an operation, the operation comprising:

identifying a regular expression in a command provided by a user, wherein the regular expression comprises a first sequence of characters that define a first search pattern, and wherein the regular expression has a first meaning in relation to a context related to the regular expression;

determining the context related to the regular expression, based on at least one of: (i) one or more attributes related to the command, (ii) one or more attributes related to the user, or (iii) one or more attributes related to an application associated with the command;

determining, based on the command, that the first meaning of the first search pattern defined by the regular expression is inconsistent with the context related to the regular expression;

retrieving, from a data repository, an adapted form of the regular expression based on the determining and the context, comprising:

identifying one or more mappings between (a) adapted forms of regular expressions and (b) combinations of:

(i) contexts of the regular expressions, and
(ii) initial forms of the regular expressions, wherein the one or more mappings have been learned based on input from a plurality of users, wherein the learning is based on determining that a threshold value is met for a percentage or number of users defining the adapted forms of regular expressions, and wherein the threshold value relates to both: (i) the percentage or number of users and (ii) the context, and is selected from among a plurality of different threshold values corresponding to a plurality of different contexts;

transforming the regular expression based on the adapted form to generate an adapted regular expression, wherein the adapted regular expression comprises a second sequence of characters that define a second search pattern, different from the first search pattern, and has a second meaning, different from the first meaning, that is consistent with the context; and evaluating the adapted regular expression to produce an output.

* * * * *